United States Patent [19]

Spongr et al.

[11] Patent Number: 4,962,518
[45] Date of Patent: Oct. 9, 1990

[54] APPARATUS FOR MEASURING THE THICKNESS OF A COATING

[75] Inventors: Jerry J. Spongr; Byron E. Sawyer, both of Tonawanda, N.Y.

[73] Assignee: Twin City International, Inc., Tonawanda, N.Y.

[21] Appl. No.: 235,946

[22] Filed: Aug. 23, 1988

Related U.S. Application Data

[63] Continuation-in-part of Ser. No. 129,477, Dec. 7, 1987, abandoned.

[51] Int. Cl.$^5$ .............................................. G01B 15/02
[52] U.S. Cl. ...................................... 378/50; 378/44; 378/148
[58] Field of Search ..................... 378/50, 44, 45, 208, 378/147, 148

[56] References Cited

U.S. PATENT DOCUMENTS

| | | | | |
|---|---|---|---|---|
| 4,534,049 | 8/1985 | Koga | ..................................... | 378/50 |
| 4,597,093 | 6/1986 | Fischer | ................................. | 378/50 |
| 4,648,107 | 3/1987 | Latter | ..................................... | 378/50 |

FOREIGN PATENT DOCUMENTS 0078310 5/1985 Japan ..................................... 378/50

Primary Examiner—Carolyn E. Fields
Assistant Examiner—David P. Porta
Attorney, Agent, or Firm—Hodgson Russ Andrews Woods & Goodyear

[57] ABSTRACT

A measuring apparatus (10) for measuring the thickness of a coating on a workpiece (36) by X-ray fluorescence. The apparatus includes a frame (12) upon which is mounted an X-ray tube (14), a shutter (16), first collimator means (18), and a mirror (20) through which an X-ray beam may be projected. Also mounted on the frame (12) is a signal detector (26), which may be in the form of a proportional counter, a fixed focal length viewing device (28) which is capable of viewing a workpiece through the mirror, and a work holder (34) carried by a work holder mount (32) which is capable of moving the workpiece (36) in x, y and z orientations. The apparatus is further provided with a second collimator means (48) shiftable by a moving apparatus (53) from an inoperative position to an operative position wherein a second collimator (50) is disposed between the mirror and the workpiece in such a manner that the terminal end (51) of the second collimator is as close as possible to the coating on the workpiece. In one embodiment there is only a single fixed first collimator and a single movably mounted second collimator. In a second embodiment there are a plurality of indexable first collimators, and a fewer number of second collimators, each second collimator being mounted in alignment with an associated first collimator.

10 Claims, 3 Drawing Sheets

APPARATUS FOR MEASURING THE THICKNESS OF A COATING

CROSS REFERENCE TO RELATED APPLICATIONS

The present application is a continuation-in-part of U.S. patent application Ser. No. 07/129,477 filed Dec. 7, 1987 entitled APPARATUS FOR MEASURING THE THICKNESS OF A COATING, now abandoned.

TECHNICAL FIELD

The present invention relates generally to an improved apparatus for measuring the thickness of a coating, the apparatus being of the type having an X-ray tube which projects X-rays towards the coating on a workpiece through a first collimator, the X-ray fluorescence being measured by a signal detector, the apparatus additionally including a fixed focal length viewing device and a mirror disposed below the first collimator whereby the workpiece, which is mounted on a movable work holder, may be properly positioned in alignment with the first collimator and at the proper distance away from the X-ray tube. According to this invention a second collimator is provided which is capable of being selectively positioned between operative and inoperative positions, and when in the operative position being disposed between the mirror and the coating to be measured and in alignment with a first collimator.

BACKGROUND OF THE INVENTION

It is well known in the art that the coating on a workpiece can be measured by utilizing X-ray fluorescence and varying machines have been developed for this purpose. Representative patents showing the state of the art are U.S. Pat. Nos. 4,406,015 and 4,656,357. The prior art typically includes a frame upon which is mounted an X-ray tube and signal detector. The X-ray beam is projected from the tube through a shutter, and then through a collimator to the workpiece, the surface of which must be held at a fixed distance from the X-ray tube and the detector. In order to properly position the workpiece with respect to the X-ray tube and collimator, a fixed focal length viewing device is typically employed, which device may be a microscope, or a closed circuit television camera and monitor. The image of the surface of the workpiece seen through the viewing device is reflected by a mirror located in the path of the X-ray beam in order to avoid parallax, the mirror being either provided with a small aperture as shown in 4,656,357 so that the X-rays can pass through the mirror, or being transparent to the X-ray beam as taught by 4,406,015. The workpiece is mounted upon a holder which can be adjusted in x, y and z axes to properly position the coating on the workpiece at the fixed distance away from the X-ray tube where the surface is in focus when viewed through the viewing device. While this form of device has proven to be generally satisfactory in most situations it has been found that when measuring coatings on very small areas it is not always possible to achieve satisfactory results. This is because the X-ray beam which exits from the terminal end of the collimator will spread outwardly in a slightly conical projection. Thus, if a very small area is to be measured and if the workpiece is disposed at some distance below the mirror, the X-ray beam which contacts the workpiece will be spread beyond to the sides of the area to be measured thereby preventing accurate measurement of the coating thickness.

OBJECTS AND SUMMARY OF THE INVENTION

It is the principal object of the present invention to provide an apparatus for measuring coating thickness of the type described above wherein the terminal end of a collimator may be disposed as close as possible to the coating on the workpiece.

More particularly, it is an object of the present invention to provide a second collimator for a coating thickness measuring apparatus of the type utilizing X-ray fluorescence and having a first collimator, the second collimator being movable between an inoperative position, where it is not disposed between a workpiece and a mirror utilized with a fixed focal length viewing device, to an operative position wherein it is disposed in such a manner that the X-ray beam which is projected through the mirror is then projected through the second collimator which, when in its operative position, has its terminal end held as close as possible to the workpiece.

It is a further object of the present invention to provide an apparatus of the type referred to above wherein differing second collimators may be utilized, which second collimators are capable of being disposed between the workpiece and the mirror.

It is a further object of the present invention to provide an apparatus wherein measurement of a coating can take place either with a movable collimator either being disposed in an operative position between the mirror and the workpiece or in an inoperative position, which measurements are desirable when measuring coating thicknesses of a width which exceeds the width of the X-ray beam projected through the mirror to the workpiece.

It is a further object of the present invention to provide an apparatus of the type referred to wherein a plurality of first collimators may be used, the first collimators being indexable between various operative positions, and wherein a plurality of second collimators may be used, each second collimator being associated with a first collimator, there generally being a lesser number of second collimators than first collimators.

The foregoing is achieved by providing a measuring apparatus including a frame upon which is mounted an X-ray tube, a shutter, first collimator means, and a mirror through which an X-ray beam may be projected. Also mounted on the frame is a signal detector, which may be in the form of a proportional counter, a fixed focal length viewing device which is capable of viewing a workpiece through the mirror, and a work holder capable of moving the workpiece in x, y and z orientations. The apparatus is further provided with a second collimator means shiftable by a moving apparatus from an inoperative position to an operative position wherein a second collimator is disposed between the mirror and the workpiece in such a manner that the terminal end of the second collimator is as close as possible to the coating on the workpiece. In one embodiment there is only a single fixed first collimator and a single movably mounted second collimator at any one time. In a second embodiment there are a plurality of indexable first collimators, and a fewer number of second collimators, each second collimator being mounted in alignment with an associated first collimator.

The objects set forth above as well as additional objects and advantages of this invention will become apparent after a consideration of the following detailed description taken in conjunction with the accompanying drawings.

DETAILED DESCRIPTION OF THE FIRST EMBODIMENT

Figure 1:
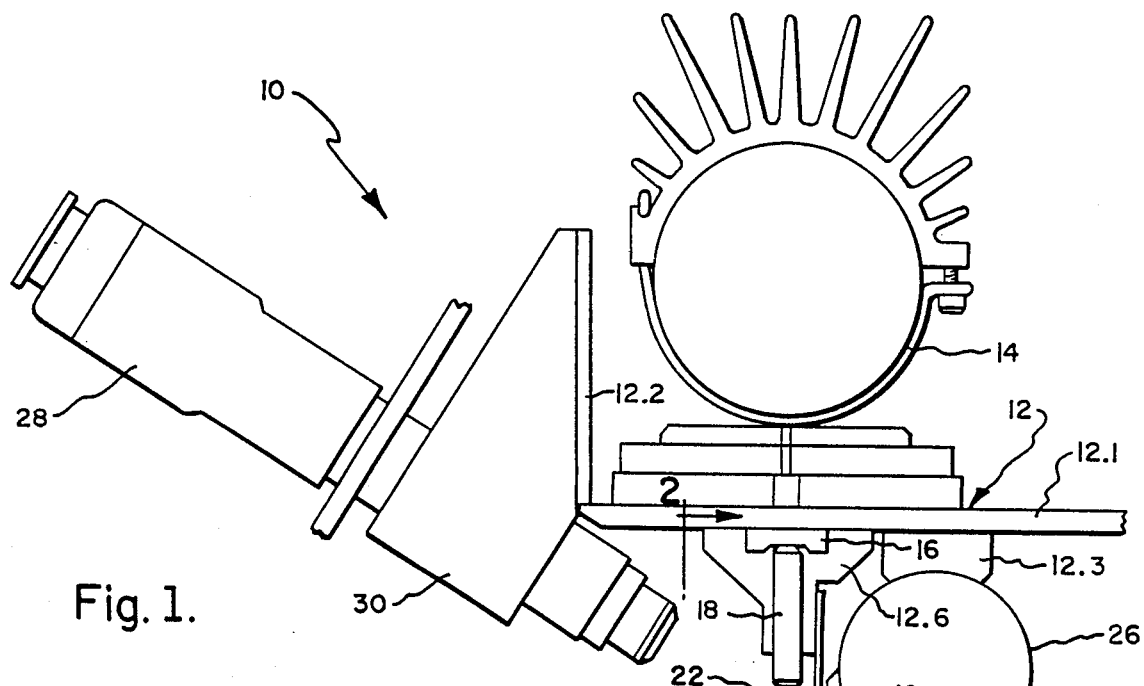
FIG. 1 is a side view of a first embodiment of the apparatus of this invention, portions of the apparatus being eliminated for purposes of clarity.

The first embodiment of this invention, which is indicated generally at 10, includes a main frame 12 which includes a horizontal intermediate mounting plate 12.1, a front upwardly extending vertical member 12.2, a depending portion 12.3, a subframe 12.4 (FIG. 2), a base plate 12.5, a base block 12.6, and other components not illustrated. Mounted upon the mounting plate 12.1 is an X-ray tube 14. Disposed below the mounting plate 12.1 and secured thereto is a shutter 16. Mounted below the shutter is a first collimator means consisting of a single first collimator 18. The term "collimator" as used herein means a device, the purpose of which is to reduce the angular spread of x-rays to the dimensions and/or angular spread required for a specific application. Mounted below the terminal end 19 of the first collimator 18 is a mirror 20 which is mounted on a mirror holder 22 which is in turn secured to the frame 12. As can be seen from FIG. 2 the mirror may be provided with a small aperture 24. Alternatively, the mirror may be of the type provided with such a thin reflective coating that X-rays may pass through the mirror. A signal detector, which may be in the form of a proportional counter 26, is secured to the depending portion 12.3 of the frame. A fixed focal length microscope 28 is secured to the front vertical member 12.2 of the frame by a bracket 30. While the fixed focal length viewing device shown in drawings is in the form of a microscope, it should be appreciated that other fixed focal length viewing devices may be employed, such as a fixed focal length television camera and a closed circuit monitor.

Figure 2:
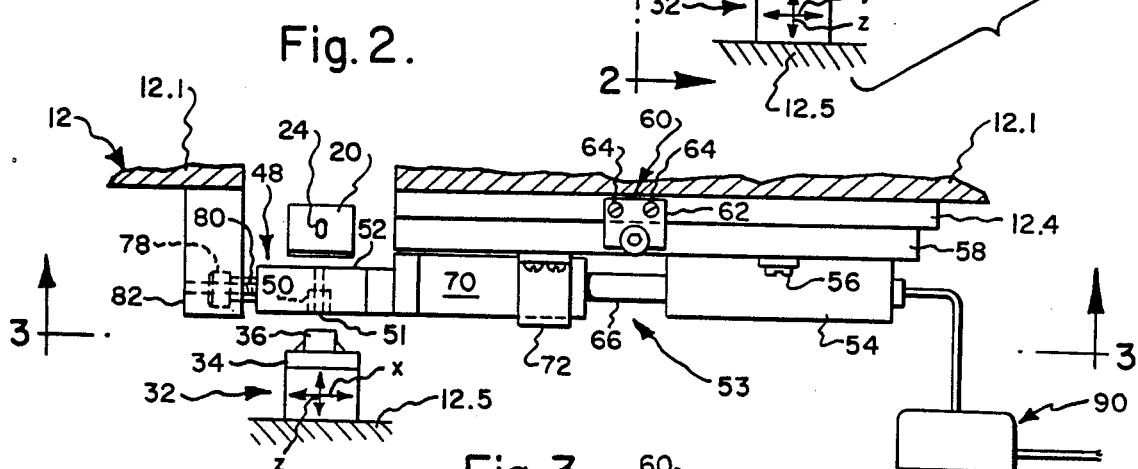
FIG. 2 is a front view of the apparatus shown in FIG. 1, this view being taken generally along the line 2—2 in FIG. 1.

Mounted upon the base 12.5 of the frame 12 are work holder mounting means indicated generally at 32, the work holder mounting means in turn supporting a work holder 34 for movement in x, y and z axes. The work holder mounting means may be of any design which provides for movement of the work holder in the x, y and z axes, and such devices are well known in the art and are commercially available from a number of sources. Thus, the work holder can be moved by the work holder mounting means from the left to the right along a y axis as viewed in FIG. 1, up and down along a z axis as viewed in FIG. 1, and also from the right to the left along an x axis as viewed in FIG. 2. The workpiece 36, whose coating thickness is to be measured, is mounted upon the work holder during the operation of the measuring apparatus of this invention. While the workpiece 36, as indicated in FIGS. 1 and 2 is of a relatively large size, in many situations the workpiece may be quite small, as for example a wire having an effective diameter of .0012 inches upon which a coating has been applied. In order to properly measure the thickness of the coating it is preferable that the X-ray beam which projects upon the workpiece be not greater than the width of the coating.

Figure 3:
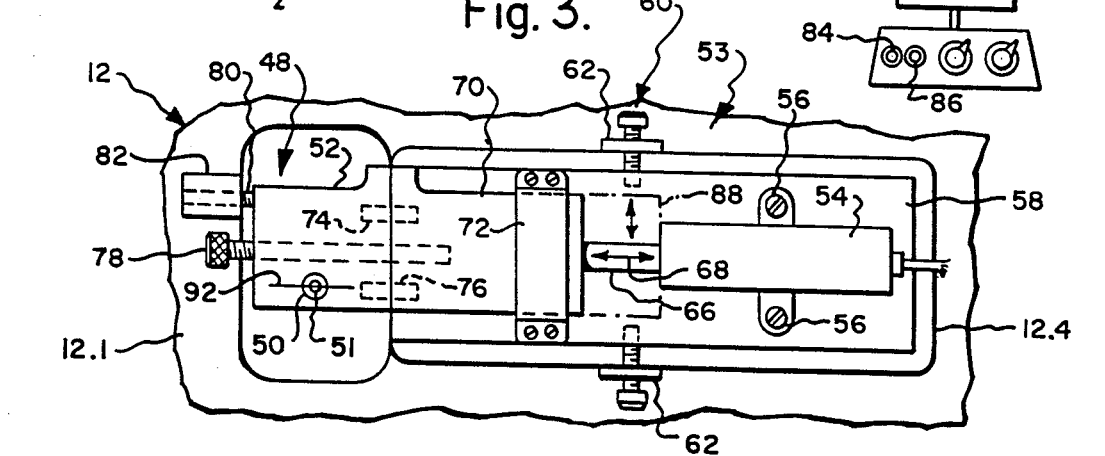
FIG. 3 is a bottom view of the structure shown in FIG. 2, this view being taken along the line 3—3 in FIG. 2.

In accordance with the principles of this embodiment in order to achieve the desired X-ray beam second collimator means 48 is provided, the second collimator means including a second collimator 50 having a terminal end 51, which second collimator is mounted in a collimator holder or cartridge 52, best shown in FIG. 3. As it is not possible to view the workpiece through the second collimator 50, means are provided for shifting the second collimator means between the operative position shown in full lines in the various figures to an inoperative position wherein the second collimator 50 and its cartridge 52 are out of the way so that the workpiece 36 can be imaged through the fixed focal length microscope 28.

Moving means 53 provided for shifting the second collimator between operative and inoperative positions is illustrated in FIGS. 2 and 3. As illustrated, the moving means includes a linear actuator in the form of an electrically operated solenoid 54, the solenoid being fastened by fasteners 56 to shiftable mounting plate 58 which can be shifted along the y axis by an adjusting mechanism indicated generally at 60. The adjusting mechanism includes a bracket 62 which is secured by fasteners 64 to the subframe member 12.4 which is in turn interconnected with the frame 12 in any conventional manner. Projecting outwardly of the solenoid 54 is a rod 66 which can be shifted from the left to the right and then back again as indicated by arrow 68. The left hand end of the rod 66 is secured to a cartridge holder 70 which is in turn guided upon the mounting plate 58 for linear movement by linear guide means 72. The collimator cartridge 52 is in turn removably secured to the cartridge holder by alignment pins 74, 76 which are carried by the cartridge holder and which may be received within suitable apertures in the sub-collimator cartridge and also by threaded fastening means 78. By releasing the fastening means 78 it is possible to remove the collimator cartridge 52 from the moving means 53 and replace the cartridge 52 with another cartridge having a differing second collimator.

When the solenoid 54 is actuated to move the second collimator to the left into its operative position as shown in FIGS. 2 and 3 the collimator cartridge will abut against a stop consisting of a set screw 80 carried by a bracket 82, the upper end of which is rigidly interconnected with a portion of the frame 12.1 in any conventional manner.

If the second collimator is not in its desired position when the solenoid is extended its position can be adjusted by extending or retracting the set screw 80 and, in addition, by moving the mounting plate along the y axis through the adjusting mechanism 60.

In operation the operator will properly position the workpiece 36 through suitable adjustments on the work holder mounting means so that the coating on the workpiece which is to be measured is properly positioned within cross-hairs on the microscope and in proper focus within the microscope. When this is accomplished the coating on the workpiece will be at a predetermined distance away from the X-ray tube. If the coating has a width which can be measured by utilizing only the first collimator 18, the operator will initiate operation of the measuring device by pushing a control button 84 which will initiate the operation of the measuring apparatus. However, if the width of the coating on the workpiece is such that it cannot be properly measured by collimator 18, the operator will then initiate operation by pushing a second control button 86. This will cause the solenoid 54 to shift the rod from the right hand position to the left hand position, to hold it there for a prescribed length of time during which the coating thickness measurement is taken, and then to retract the cartridge and cartridge holder to the broken line position 88 after the measurement has been completed so that the operator can again view the workpiece through the microscope. By utilizing the foregoing design it is possible to position the terminal end 51 of the second collimator 50 as close as possible to the coating on the workpiece.

The operation of the solenoid, as well as the X-ray unit, and signal detector are in turn controlled through a control indicated generally at 90, which control may be a microprocessor based computer.

While the linear actuator shown in FIGS. 2 and 3 for moving the second collimator means between operative and inoperative positions is controlled by a solenoid, it should be appreciated various other mechanisms may be used for shifting a second collimator means in a linear path. One such mechanism may be an anti-backlash screw mechanism similar to that shown in the second embodiment of FIGS. 4-6, which mechanism is controlled by a stepping motor. By using such a stepping motor and anti-backlash screw mechanism it is possible to move the second collimator means not only between an inoperative position and a first operative position, but also to position the collimator cartridge 52 in various other operative positions. This may be desired when additional second collimators are positioned on the collimator cartridge in a linear array which would permit sequential measurements of differing portions of a workpiece using differing second collimators, the various second collimators being positioned along the line 92.

In addition, it should be appreciated that while a linear actuator has been shown for moving the second collimator between operative and inoperative positions, it is also possible to utilize other mechanisms. For example, the cartridge holder 70 could be mounted upon a vertically extending rotary shaft for rotational movement therewith, and the shaft could be rotated to position the second collimator in either operative or inoperative positions. If this were the case than the stop mechanism 80, 82 would have to be positioned to the front or to the rear of the collimator cartridge (depending upon its inoperative position). It is also possible that the mechanism which supports the rotary shaft could be adjusted in and x, y plane to properly position the second collimator in its desired location. The mechanism for causing the shaft to rotate could be simply a rock arm connected at one end to the shaft and at the other end to a solenoid or the like. Alternatively, the shaft could be driven between its two positions by a reversible electric motor through a slip clutch mechanism.

DETAILED DESCRIPTION OF THE SECOND EMBODIMENT

Figure 4:
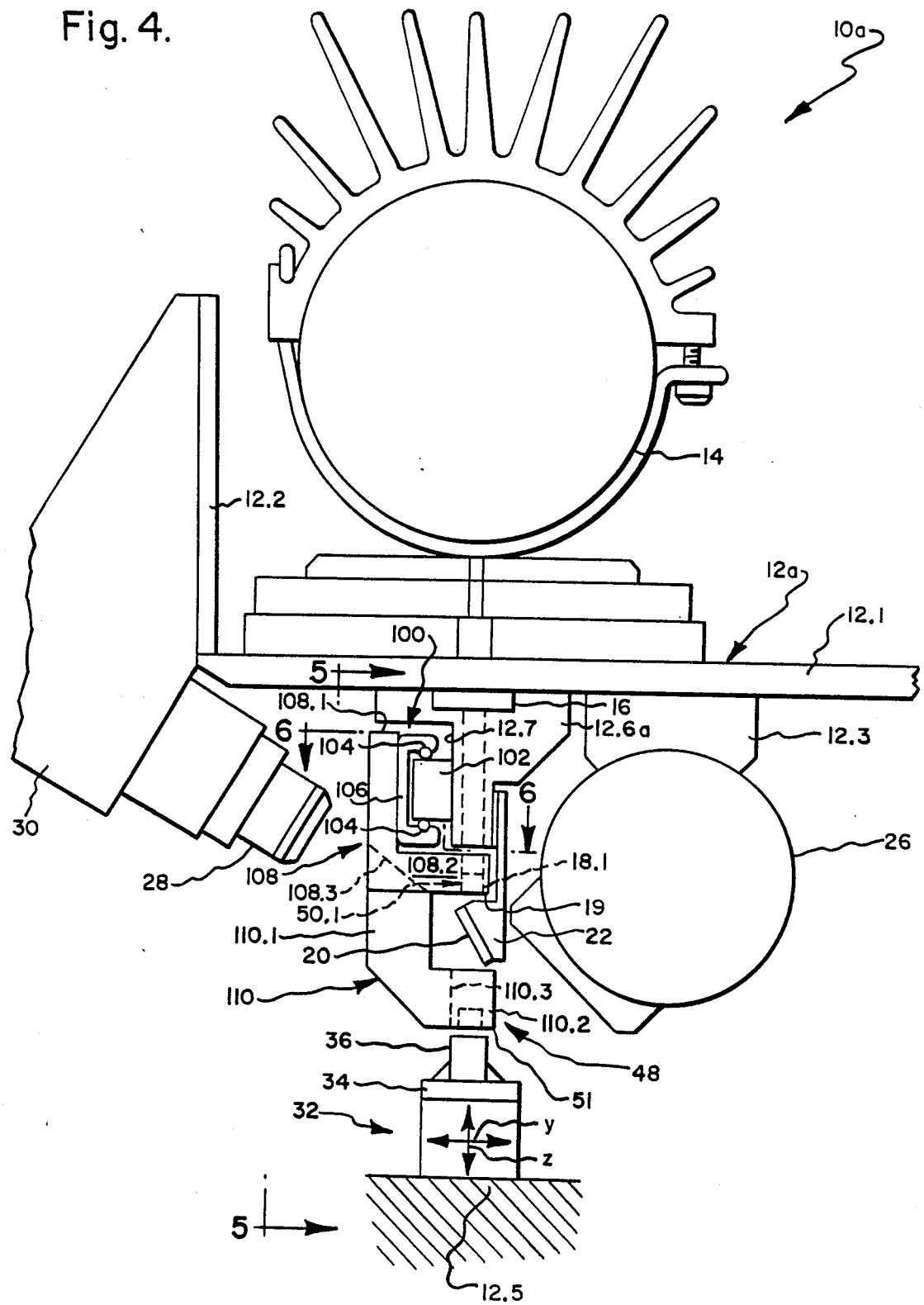
FIG. 4 is a side view of a second embodiment of the apparatus of this invention, portions of the apparatus being eliminated for purposes of clarity.
Figure 5:
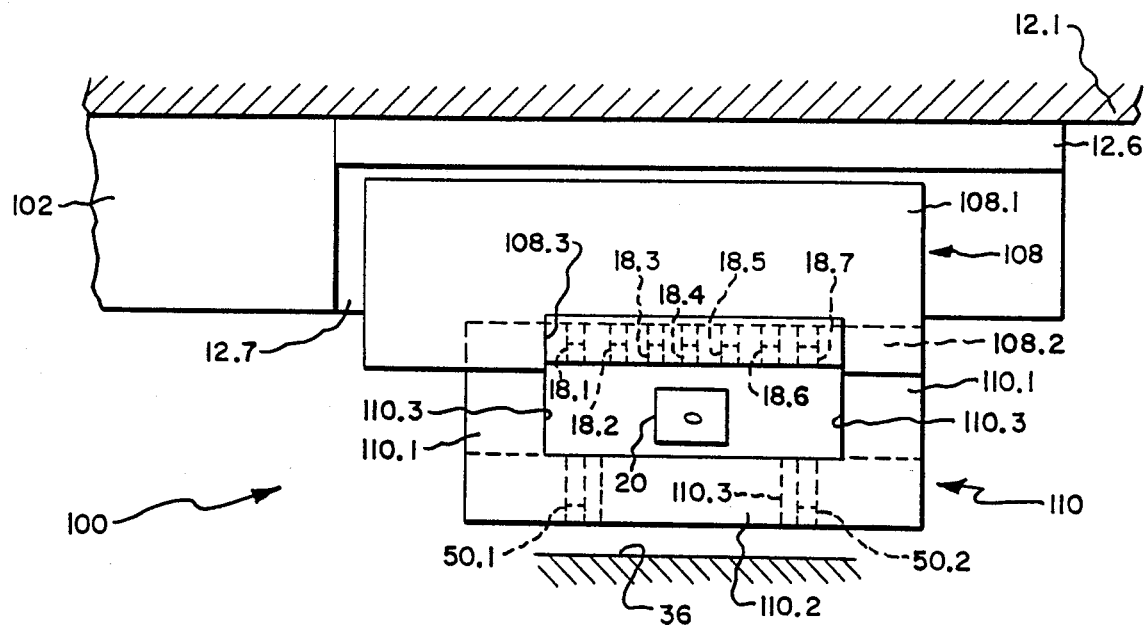
FIG. 5 is a front view of the apparatus shown in FIG. 4, this view being taken generally along the line 5—5 in FIG. 4, portions of the apparatus not being shown.
Figure 6:
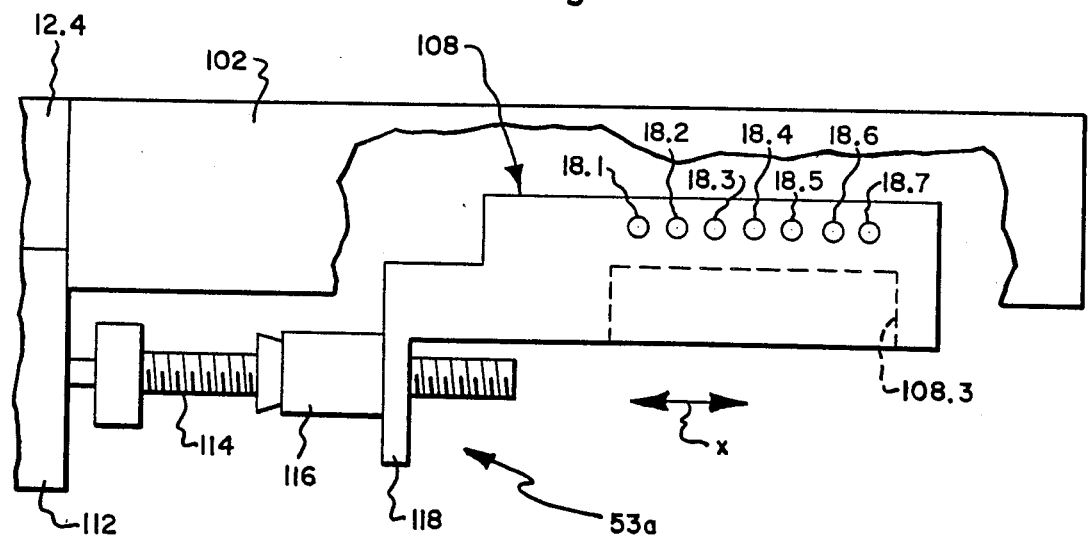
FIG. 6 is a view taken generally along the line 6—6 in FIG. 4 and illustrating the manner in which a portion of the apparatus is moved, portions of the apparatus also not being shown for purposes of clarity.

A second embodiment of this invention is illustrated in FIGS. 4 through 6. In these figures parts which are generally the same as parts shown in FIGS. 1 through 3 will bear the same reference numeral, and parts which differ somewhat will bear the same reference numeral followed by the letter "a". Thus, the frame is indicated generally at 12a, the X-ray tube at 14, the shutter at 16, the mirror at 20, the mirror holder at 22, the signal detector at 26, the fixed focal length viewing device at 28, and the work holder generally at 32. These various devices are all associated with each other in the same manner as in the device shown in FIGS. 1 through 3. The embodiment shown in FIGS. 4 through 6 differs primarily from the embodiment shown in FIGS. 1 through 3 in that a plurality of first collimators 18.1 through 18.7 are mounted on a slide assembly indicated generally at 100, the slide assembly also carrying a plurality of second collimators 50.1 and 50.2 which are mounted in alignment with the first collimators 18.1 and 18.7. Also, means are provided for moving the slide assembly.

Thus, with reference to FIGS. 4 through 6, it can be seen that the frame 12a is provided with a base block 12.6a of somewhat differing configuration than that shown in FIGS. 1 through 3. Thus, the base block 12.6a has an extended vertical surface 12.7. Mounted on an opposed vertical surface (no number) is the mirror holder 22. Mounted on the forward vertical surface 12.7 of base member 12.6 is the slide assembly 100. The slide assembly consists essentially of a horizontally extending mounting block 102 having opposed horizontally disposed surfaces which receive linear bearings 104 and a slide 106 which is C-shaped in cross section, the slide being supported by the bearings 104. Secured to the slide 106 is a first collimator support indicated generally at 108, the first collimator support including a vertical portion 108.1 and a lower horizontal support portion 108,2 which extends to the rear. The first collimator support is in addition provided with a suitable cut out indicated by 108.3 to facilitate viewing of the coating whose thickness is to be measured. The rear of the portion 108.2 is provided with a plurality of linearly arrayed apertures (no number), the bottom of each aperture receiving one of the first collimators 18.1 through 18.7. These first collimators are preferably mounted in such a manner that they are fixed to the first collimator support 108.

Secured to a lower surface of the first collimator support 108 is a second collimator support indicated generally at 110 (not shown in FIG. 6). The second collimator support is essentially L-shaped having a vertical leg 110.1 and a horizontal leg 110.2. The vertical leg is provided with a cutout 110.3 between the second collimators 50.1 and 50.2 to permit the coating to be viewed from the viewing device and also, so that when the apparatus is being used in conjunction with first collimators 18.2 through 18.6, it will be possible for the X-ray beam to pass directly to the coating to be measured. The horizontal leg 110.2 provided with two apertures concentric with those apertures which receive first collimators 18.1 and 18.7, the apertures in turn receiving second collimators 50.1 and 50.2 which are also in concentric alignment with first collimators 18.1 and 18.7. The second collimators 50.1 and 50.2 are preferably fixed to support 110. However, as the support 110 is removably secured to the support 108, it is possible to vary the second collimators without varying the first collimators by providing a plurality of differing second collimator supports, each having its own set of second collimators. While not shown, suitable alignment means, similar to the alignment pins 74, 76 shown in FIG. 3, may be provided to insure that when the support 110 is secured to support 108 that the second collimators 50.1 and 50.2 are in proper alignment with the associated first collimators 18.1 and 18.7 respectively.

The moving means, indicated generally at 53a in FIG. 6, for moving the first collimator of this embodiment along the X-axis will also move the second collimator. The moving means includes a stepping motor 112 which drives an anti-backlash screw 114 which in turn engages a corresponding nut 116, which nut is suitably secured to a bracket 118 (shown only in FIG. 6) carried by the first collimator support 108. The stepping motor 112 is in turn suitably secured to a subframe 12.4.

The operation of the stepping motor in the embodiment shown in FIGS. 4 through 6 is suitably controlled by a control similar to that shown at 84, 86, 90 and 92 in FIG. 2, which control may additionally be provided with a suitable keypad. Thus, in operation the operator will properly position the workpiece through suitable adjustments of the work holder mounting means so that the coating on the workpiece which is to be measured is properly positioned within the cross hairs on the microscope 28 and is also within proper focus. When this is accomplished the coating on the workpiece will be at a predetermined distance from the X-ray tube 14. If the coating has a width which can be measured by utilizing only one of the first collimators 18.2 through 18.6 the operator will initiate operation of the measuring device by pushing a suitable control button or keys which will cause the stepping motor 112 to move the first collimator support 108 to its desired position wherein the selected first collimator is in line with the X-ray beam. However, if the width of the coating on the workpiece is such that it cannot properly be measured by use of any one of the first collimators 18.2 through 18.6, the operator will push another control button or keys which will then cause the first collimator support 108 to be moved to another position to position a desired first and second collimator combination, either 18.1 and 50.1 or 18.7 and 50.2 in line with the X-ray beam. By utilizing the foregoing design it is possible to rapidly change among seven differing collimator arrangements all present within the measuring apparatus shown in the embodiment of FIGS. 4 through 6.

While a stepping motor has been shown and described above, it should be appreciated that various other mechanisms may be used for shifting the first collimator support 108 and second collimator support 110. One such mechanism may be a piezoelectric motor driven screw. Other mechanisms for positioning the first and second collimators will become apparent to those skilled in the art.

While two embodiments in which the principles of the present invention have been incorporated are shown and described above, it is to be understood that this invention is not to be limited to the particular details shown and described above, but that, in fact, widely differing means may be employed in the broader aspects of this invention.

What is claimed is:
1. An improved apparatus for measuring the thickness of a coating on the surface of a workpiece; the improved apparatus:
   a frame (12);
   an X-ray tube (14) mounted on the frame;
   a work holder (34) for holding a workpiece (36);
   a mirror (20) mounted on the frame, the radiation from the X-ray tube being projected through the mirror to a coating on the surface of a workpiece during the measurement of the coating;
   first collimator means (19) mounted on the frame between the X-ray tube and the mirror;
   a fixed focal length viewing device (29) mounted on the frame through which the coating may be viewed, the view of the coating being reflected to the viewing device by the mirror;
   work holder mounting means mounted on the frame and capable of moving the work holder and the associated workpiece in such a manner that the coating which is to be measured may be moved into position where it can be viewed through the viewing device in sharp focus, the coating when in sharp focus being a predetermined distance away from the X-ray tube; and
   signal detector means (26) mounted on the frame;
   wherein the improvement comprises second collimator means (48), and moving means (53) mounted on the frame and capable of moving the second collimator means between operative and inoperative positions, the second collimator means including a second collimator (50) movable between operative and inoperative positions and being between the mirror and the workpiece when in the operative position, the terminal end (51) of the second collimator being disposed as close as possible to the coating to be measured when in an operative position so that the X-ray beam which contacts the coating will not spread beyond the sides of the area of the coating to be measured, and wherein the coating may be viewed through the viewing device when the second collimator is in an inoperative position.

2. The improved apparatus for measuring the thickness of a coating as set forth in claim 1 wherein the second collimator means (48) includes a collimator holder (52), the second collimator (50) being mounted on the collimator holder, the collimator holder being removably secured to the moving means.

3. The improved apparatus for measuring the thickness of a coating as set forth in claim 1 wherein the second collimator means includes a collimator holder (52), said second collimator, as well as additional second collimators being mounted on the holder and wherein the moving means includes means to move the collimator holder to a plurality of operative positions whereby differing second collimators may be utilized during measurements.

4. The improved apparatus for measuring the thickness of a coating as set forth in claim 1 wherein the moving means is a linear actuator.

5. The improved apparatus for measuring the thickness of a coating as set forth in claim 1 wherein the moving means is a rotary actuator.

6. The improved apparatus for measuring the thickness of a coating as set forth in claim 1 further characterized by the first collimator means including a plurality of first collimators mounted on a slide (106) for transverse movement between the x-ray tube and the mirror, the moving means being capable of moving the slide between a plurality of differing operative positions, only one first collimator being in an operative position for each of the plurality of operative positions.

7. The improved apparatus for measuring the thickness of a coating as set forth in claim 6 further characterized by the second collimator means being connected to the first collimator means for movement therewith, the second collimator means including a plurality of second collimators, each of the second collimators being positioned in axial alignment with an associated first collimator.

8. The improved apparatus for measuring the thickness of a coating as set forth in claim 7 wherein the number of second collimators is equal or less that the number of first collimators, the slide when in one operative position having first and second collimators in alignment with the coating to be measured, and when the slide is in another operative position only a first collimator being in alignment with the coating to be measured.

9. The improved apparatus for measuring the thickness of a coating as set forth in claim 6 further characterized by the second collimators being removably mounted.

10. An improved apparatus for measuring the thickness of a coating of the type having:
a frame;
an x-ray tube mounted on the frame;
a mirror mounted on the frame, the radiation from the x-ray tube capable of being projected through the mirror during the measurement of a coating on a workpiece;
a fixed focal length viewing device mounted on the frame through which the coating of the surface of the workpiece may be viewed, the view of the coating being reflected to the viewing device by the mirror; and
signal detector means mounted on the frame; wherein the improvement comprises:
a first collimator means mounted on the frame, the first collimator means including a plurality of lineraly arrayed first collimators mounted between the x-ray tube and the mirror;
a second collimator means mounted to the first collimator means, the second collimator means including a plurality of removable second collimators where all of the second collimators are positioned in line with a first collimator, the second collimators being mounted below the mirror and the second collimator means being movable between a series of operative and inoperative positions as determined by the location of the first collimator means; and
moving means mounted on the frame and capable of moving the first and second collimator means between a series of operative positions wherein only one first collimator is in an operative location for each operative position.

* * * * *